UNITED STATES PATENT OFFICE.

JOHN W. DIXON, OF PHILADELPHIA, PENNSYLVANIA.

IMPROVED PROCESS OF MAKING PAPER-PULP FROM WOOD, STRAW, AND OTHER VEGETABLE FIBROUS SUBSTANCES.

Specification forming part of Letters Patent No. 52,546, dated February 13, 1866.

*To all whom it may concern:*

Be it known that I, JOHN W. DIXON, of the city of Philadelphia and State of Pennsylvania, have invented a new and useful Improvement in the Process of Making Paper-Pulp from Wood, Straw, Cornstalks, and other Vegetable Fibrous Substance; and I do hereby declare the following to be a full and exact description of the same.

I cut the wood, straw, cornstalks, &c., into short lengths by any convenient cutting-machine. The cuttings are then placed in a closed boiler or digester and submitted to the action of a highly-heated solution of carbonate of potash under pressure. By the words "under pressure" is meant that due to a temperature at, near, or above 300° of Fahrenheit's scale, which is as low as it is advisable to work the process. With wood I find a solution of 2° to 5° Baumé, at a pressure of eighty pounds to one hundred and twenty pounds and the corresponding temperature thereto, will complete the pulping operation. A less strength of solution at this temperature—say from 2° to 4° of Baumé—will answer with straw, cornstalks, or sorghum, and I indicate these temperatures and strength respectively as giving good practical results in a good digesting apparatus, such as hereinafter described. I prefer, also, to perform the digesting operation under pressure in the peculiar apparatus for which I have applied for a patent, in which the boiling liquid under pressure containing the carbonate of potash is made to circulate from the bottom to the top of the digester and through the mass to be pulped within the digester by means of a pump.

The heat may be communicated by a coil of steam or hot-water pipes in the bottom of the digester or any other convenient mode.

I do not desire to limit myself to the above degrees of temperature for treating the material, nor the above strength of solution, nor to any form of pulp-digesting apparatus. The heat of the liquid solution in the digester may be varied from 300° to 400° Fahrenheit, according to the nature of the substance to be treated, the length of the time under treatment, and the form of digesting apparatus adopted.

Having thus described my invention, what I claim as new, and desire to secure by Letters Patent, is—

The process of treating wood or other vegetable substances by boiling in a solution of carbonate of potash, under pressure, as a process or preparatory process for making pulp for the manufacture of paper from wood, straw, or other vegetable substances, substantially as described.

JOHN W. DIXON.

Witnesses:
JOS. JORDAN, Jr.
T. HATT.